United States Patent
Aoyama

(10) Patent No.: US 7,636,114 B2
(45) Date of Patent: Dec. 22, 2009

(54) IMAGE SENSING APPARATUS AND CONTROL METHOD CAPABLE OF PERFORMING DUST CORRECTION

(75) Inventor: Keisuke Aoyama, Kawasaki (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 741 days.

(21) Appl. No.: 10/555,023

(22) PCT Filed: Sep. 9, 2005

(86) PCT No.: PCT/JP2005/017081

§ 371 (c)(1),
(2), (4) Date: Oct. 26, 2005

(87) PCT Pub. No.: WO2006/030874

PCT Pub. Date: Mar. 23, 2006

(65) Prior Publication Data

US 2007/0030378 A1 Feb. 8, 2007

(30) Foreign Application Priority Data

Sep. 13, 2004 (JP) .............................. 2004-265932

(51) Int. Cl.
*H04N 9/64* (2006.01)
(52) U.S. Cl. ...................................... 348/246; 348/247
(58) Field of Classification Search ................. 348/246, 348/247, 248
See application file for complete search history.

(56) References Cited

U.S. PATENT DOCUMENTS

| | | | | |
|---|---|---|---|---|
| 6,233,364 B1 * | 5/2001 | Krainiouk et al. | ........... | 382/275 |
| 6,307,393 B1 * | 10/2001 | Shimura | ..................... | 348/246 |
| 6,683,643 B1 * | 1/2004 | Takayama et al. | ........... | 348/247 |
| 6,791,608 B1 * | 9/2004 | Miyazawa | .................. | 348/246 |
| 6,940,550 B2 * | 9/2005 | Kitawaki et al. | ............ | 348/246 |

FOREIGN PATENT DOCUMENTS

| JP | 09-051459 | 2/1997 |
|---|---|---|
| JP | 2000-312314 | 11/2000 |
| JP | 2002-237992 | 8/2002 |
| JP | 2003-344953 | 12/2003 |

* cited by examiner

*Primary Examiner*—Luong T Nguyen
(74) *Attorney, Agent, or Firm*—Cowan, Liebowitz & Latman, P.C.

(57) ABSTRACT

A pixel position corresponding to dust present on an image sensor and its optical system is detected from a dust detection sensed image. It is checked for a normally sensed image obtained by normal image sensing whether each pixel data is data at the pixel position corresponding to dust. Data at the pixel position corresponding to dust undergoes a correction process. An image sensing apparatus capable of suppressing the influence of dust on a sensed image even if dust attaches to the image sensor or its optical system can be realized.

10 Claims, 8 Drawing Sheets

IMAGE SENSING APPARATUS AND CONTROL METHOD CAPABLE OF PERFORMING DUST CORRECTION

TECHNICAL FIELD

The present invention relates to an image sensing apparatus which senses an image by using an image sensor such as a CCD or CMOS, and a control method therefor.

BACKGROUND ART

Recently, many image sensing apparatuses (e.g., a digital camera and digital video camera) which record an image as data by using an image sensor such as a CCD have hit the market. A digital camera does not require any photographic film which has conventionally been used as a recording medium. Instead, the digital camera records an image as data on a data recording medium such as a semiconductor memory card or hard disk device. Unlike the film, these data recording media enable repetitive write and erase conveniently, and can reduce the cost of consumables.

A digital camera is generally equipped with an LCD monitor device capable of displaying a photographed image on request, and a removable large-capacity storage device.

By using the digital camera having these two devices, a film serving as a recording medium which has conventionally been used as a consumable need not be used, and a photographed image can be displayed and confirmed on the LCD monitor device at once. The user can erase unsatisfactory image data on the moment, or if necessary, photograph an object again on site. Compared to a photograph using a photographic film, the photographing efficiency significantly rises.

With this convenience and technical innovation for a larger number of pixels of an image sensor, the utilization of digital cameras is becoming wider. These days, lens exchangeable type digital cameras such as a single-lens reflex digital camera are also available.

Unlike a film camera in which the film is transported every photographing, a digital camera takes a picture by always using the same image sensor. Dust and mote (to be generally referred to as "dust" hereinafter), which attach on an image sensor, an image sensor protective glass fixed to the image sensor, the surface of an optical filter or the like, and an optical system (to be referred to as optical system components of the image sensor at once hereinafter), stay there unless they are removed. At the position at which dust attaches, dust shields light to inhibit photographing, degrading the quality of a photographed image.

In not only a digital camera but also a camera using a photographic film, if dust exists on a film, it is also photographed. However, the film is transported every frame, and the same dust is hardly sensed successive frames.

To the contrary, the image sensor of the digital camera is fixed and not transported, and a common image sensor is used for photographing. Once dust attaches to the optical system component of the image sensor, the same dust is sensed in many frames (photographed images). Especially in a lens exchangeable type digital camera, dust readily attaches in exchanging a lens.

The photographer must always be careful about attachment of dust to the optical system component of the image sensor, and spends much effort on checking and cleaning dust. In particular, since the image sensor is placed relatively deep in the camera, cleaning the sensor and confirmation of dust are not easy. In cleaning, dust may attach adversely.

Dust readily enters the lens exchangeable type digital camera during lens exchange. In addition, most of lens exchangeable type digital cameras have a focal-plane shutter in front of the image sensor, and dust easily attach on the optical system component of the image sensor.

In an image reading apparatus such as a film scanner, a technique to detect dust on a document table or a film document from a read image and correct the image is known (see, e.g., Japanese Patent Laid-Open No. 2003-344953). However, an environment in which the image sensor of an image reading apparatus of this type is placed is greatly different from that of a digital camera. Also, dust detection on a document is focused, and no dust detection on an image sensor is considered.

Since dust readily attaches on the optical system component of the image sensor in the lens exchangeable type digital camera owing to its mechanism, it is important to detect attached dust, how to process detected dust, and photograph an image free from any influence of dust. If dust is left unprocessed, dust is directly sensed into an image. Dust correction at an unnecessary portion owing to a detection error of the dust position or an excessive dust process degrades an image.

DISCLOSURE OF INVENTION

The present invention has been made to overcome the conventional drawbacks, and has as its object to provide an image sensing apparatus capable of suppressing the influence of dust on a photographed image even if dust attaches to an image sensor, a protective glass fixed to the image sensor, or a filter, and a control method therefor.

According to an aspect of the present invention, there is provided an image sensing apparatus which senses an image by using an image sensor, characterized by comprising: dust position detection means for detecting a pixel position corresponding to dust present on the image sensor and an optical system of the image sensor from a dust detection-sensed image obtained by sensing a dust detection image; and correction means for performing a correction process for data at the pixel position corresponding to the dust among pixel data which form a normally sensed image obtained by normal image sensing.

According to another aspect of the present invention, there is provided a method of controlling an image sensing apparatus which senses an image by using an image sensor, characterized by comprising: a dust position detection step of detecting a pixel position corresponding to dust present on the image sensor and an optical system of the image sensor from a dust detection sensed image obtained by sensing a dust detection image; and a correction step of performing a correction process for data at the pixel position corresponding to the dust among pixel data which form a normally sensed image obtained by normal image sensing.

With this arrangement, the present invention can suppress the influence of dust on a photographed image even if dust attaches to an image sensor, a protective glass fixed to the image sensor, or a filter.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings.

First Embodiment

Figure 1:
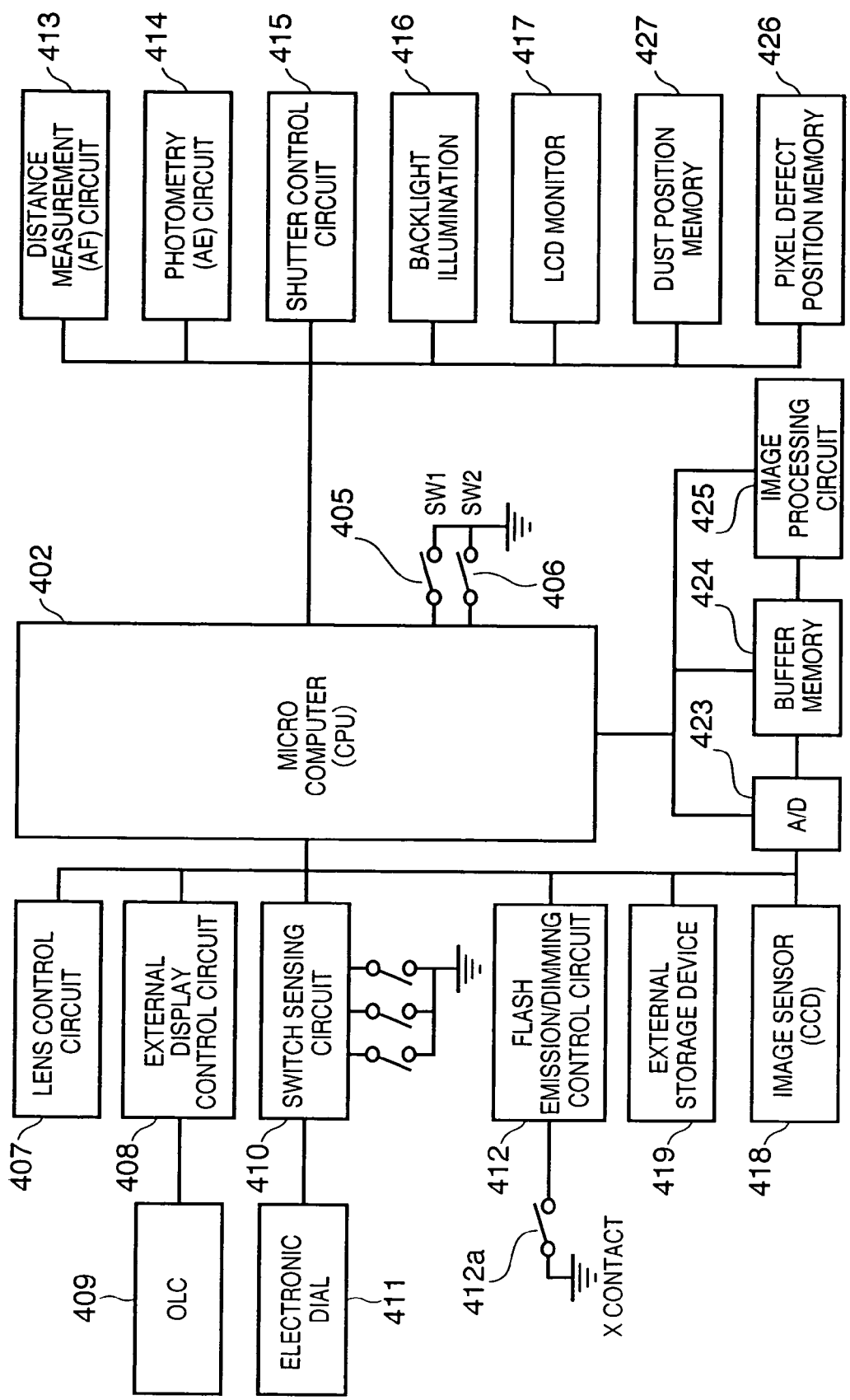
FIG. 1 is a block diagram showing an example of the circuit configuration of a single-lens reflex digital camera as an example of a lens exchangeable type image sensing apparatus according to an embodiment of the present invention.

FIG. 1 is a block diagram showing an example of the circuit configuration of a lens exchangeable type digital camera as an example of an image sensing apparatus according to the first embodiment of the present invention. In FIG. 1, a microcomputer 402 controls operation of the whole camera, including a process for image data output from a CCD 418 serving as an example of an image sensor, and display control of an LCD monitor device 417.

When a release button 114 (see FIG. 2) is pressed halfway, a switch (SW1) 405 is turned on (ON), and the digital camera prepares for photographing in response to ON operation of the switch (SW1) 405. When the release button 114 is pressed fully, a switch (SW2) 406 is turned on (ON), and the digital camera starts photographing in response to ON operation of the switch (SW2) 406.

A lens control circuit 407 controls communication with a photographing lens 200 (see FIG. 3), driving of the photographing lens 200 in AF (Auto Focus), and driving of an aperture blade.

In FIG. 1, an external display control circuit 408 controls an external display device (OLC) 409 and the display device (not shown) of the viewfinder. A switch sensing circuit 410 sends signals to the microcomputer 402 from many switches including an electronic dial 411 (115 in FIG. 2) attached to the camera.

A flash emission/dimming control circuit 412 is grounded via an X contact 412a, and controls an external flash. A distance measurement circuit 413 detects the defocus amount of an object for AF (Auto Focus). A photometry circuit 414 measures the brightness of an object.

A shutter control circuit 415 controls the shutter, and performs correct exposure of a CCD 418. The LCD monitor device 417 and a backlight illumination device 416 form an image display device. A storage device 419 is, e.g., a hard disk drive or semiconductor memory card reader/writer.

The microcomputer 402 is connected to an A/D converter 423, an image-buffer memory 424, an image processing circuit 425 which is formed from a DSP and the like, a pixel defect position memory 426 which stores the presence of a defect at a predetermined pixel itself in the CCD, and a dust position memory 427 which stores a pixel position in the CCD 418 at which an image error has occurred owing to dust. The pixel defect position memory 426 and dust position memory 427 preferably use nonvolatile memories. The pixel defect position memory 426 and dust position memory 427 may use different address areas in the same memory space.

Figure 2:
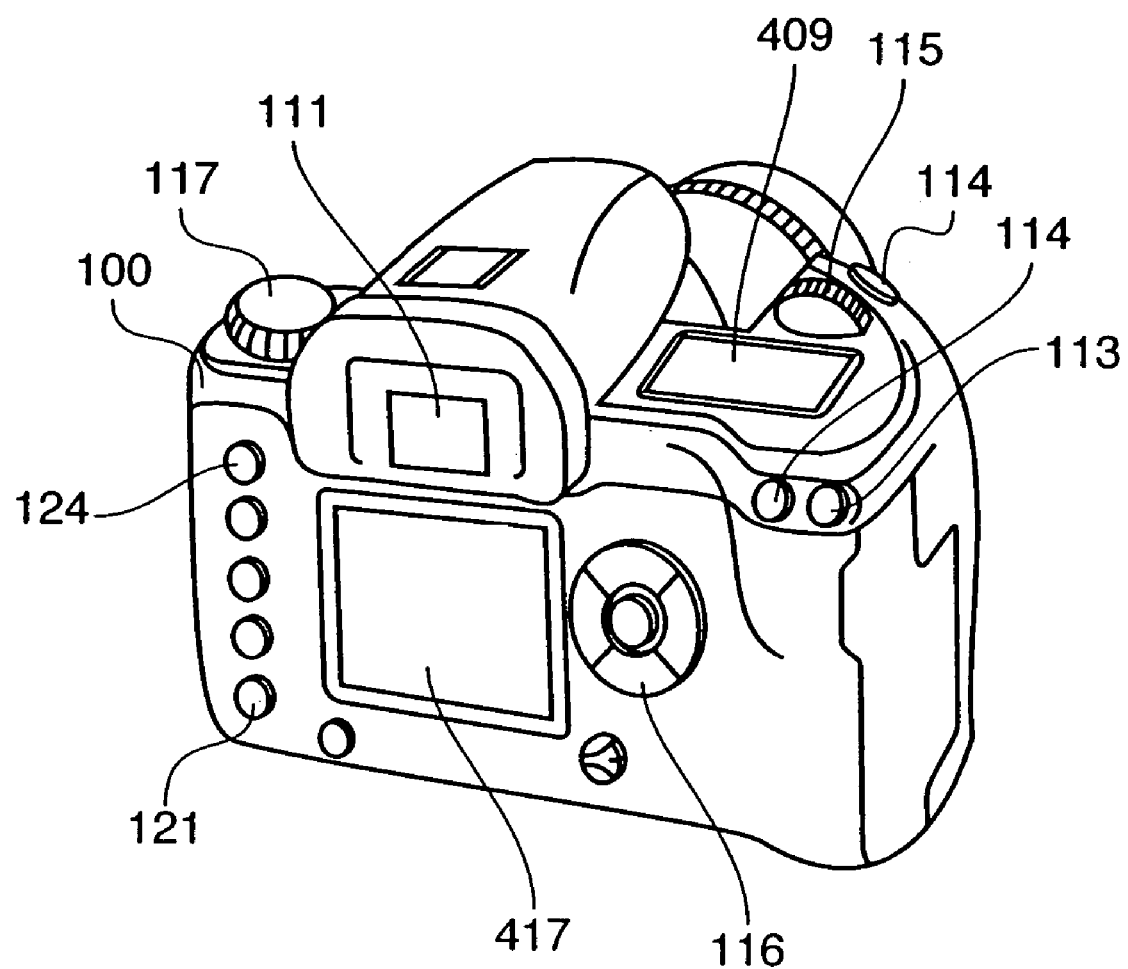
FIG. 2 is a perspective view showing an example of the outer appearance of the digital camera according to the embodiment.
Figure 3:
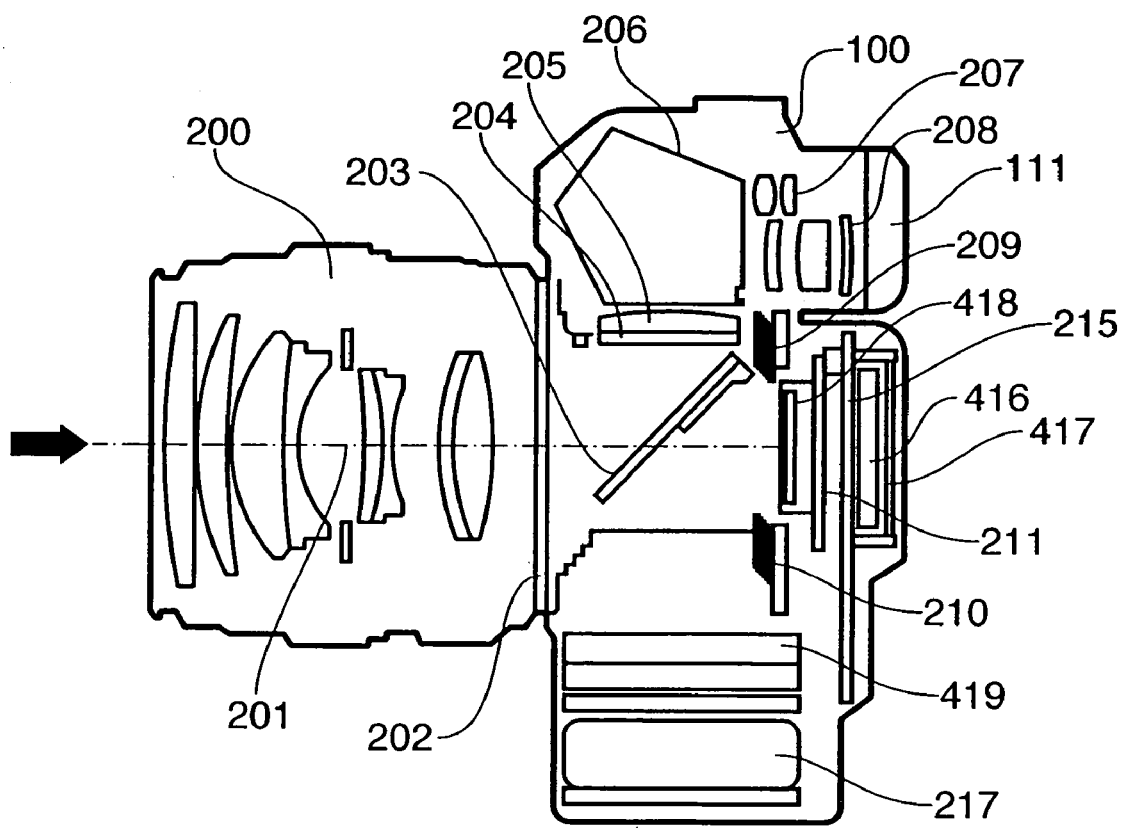
FIG. 3 is a longitudinal sectional view showing the internal structure of the digital camera according to the embodiment.

FIG. 2 is a perspective view showing an example of the outer appearance of the digital camera according to the first embodiment. FIG. 3 is a longitudinal sectional view showing the digital camera having the arrangement in FIG. 2.

In FIGS. 2 and 3, the top of a camera main body 100 is equipped with a viewfinder observation eyepiece window 111, an AE (Auto Exposure) lock button 112, an AF (Auto Focus) measurement distance point selection button 113, the release button 114 for photographing, the electronic dial 115, a photographing mode selection dial 117, and the external display device 409. The electronic dial 115 is a multi-functional signal input device used to input a numerical value into the camera and switch the photographing mode in cooperation with another operation button. The external display device 409 is formed from a liquid crystal display device, and displays photographing conditions (e.g., shutter speed, F-number, and photographing mode) and another information.

The back surface of the camera main body 100 is equipped with the LCD (Liquid Crystal Display) monitor device 417 which displays a sensed image, various setting windows, and the like, a monitor switch 121 for turning on/off the LCD monitor device 417, a cross-shaped switch 116, and a menu button 124.

The cross-shaped switch 116 has four buttons which are arranged up, down, right, and left, and a SET button which is arranged at the center. The cross-shaped switch 116 is used when the user instructs the camera to select and execute a menu item or the like displayed on the LCD monitor device 417.

The menu button 124 is used to display a menu window for displaying various settings of the camera on the LCD monitor device 417. For example, to select and set the photographing mode, the menu button 124 is pressed, the upper, lower, right, and left buttons of the cross-shaped switch 116 are operated to select a desired mode, and the SET button is pressed while the desired mode is selected, thus completing setting. The menu button 124 and cross-shaped switch 116 are also used to set a dust mode (to be described later), set a display mode in the dust mode, and set an identification mark.

Since the LCD monitor device 417 according to the first embodiment is of transmission type, an image cannot be checked by only driving the LCD monitor device, and the backlight illumination device 416 is always necessary on the backside of the LCD monitor device 417, as shown in FIG. 3. As described above, the LCD monitor device 417 and backlight illumination device 416 form an image display device.

As shown in FIG. 3, the photographing lens 200 of the image sensing optical system is exchangeable from the camera main body 100 via a main body mount 202. In FIG. 3, reference numeral 201 denotes a photographing optical axis; and 203, a quick-return mirror.

The quick-return mirror 203 is inserted in the photographing optical path, and can be moved between a position (position shown in FIG. 3: to be referred to as an inclined position) at which the quick-return mirror 203 guides object light from the photographing lens 200 to the viewfinder optical system, and a position (to be referred to as a retract position) at which the quick-return mirror 203 retracts from the photographing optical path.

In FIG. 3, a focusing screen 204 images object light guided from the quick-return mirror 203 to the viewfinder optical system. Reference numeral 205 denotes a condenser lens which improves the visibility of the viewfinder; and 206, a pentagonal roof prism which guides object light passing through the focusing screen 204 and condenser lens 205 to a viewfinder observation eyepiece lens 208 and photometry sensor 207.

Reference numerals 209 and 210 denote a rear curtain and front curtain which form the shutter. By releasing the rear curtain 209 and front curtain 210, the CCD 418 serving as a solid-state image sensing element arranged back is exposed to necessary light. A photographed image which is converted into an electrical signal of each pixel by the CCD 418 is processed by the A/D converter 423, image processing circuit 425, and the like, and recorded as image data in an external storage device.

The CCD 418 is held by a printed board 211. A display substrate 215 serving as another printed board is arranged on the backside of the printed board 211. The LCD (Liquid Crystal Display) monitor device 417 and backlight illumination device 416 are arranged on a side of the display substrate 215 opposite to the printed board 211.

The external storage device 419 records image data. Reference numeral 217 denotes a battery (portable power supply). The external storage device 419 and battery 217 are detachable.

(Dust Detection Process)

Figure 5:
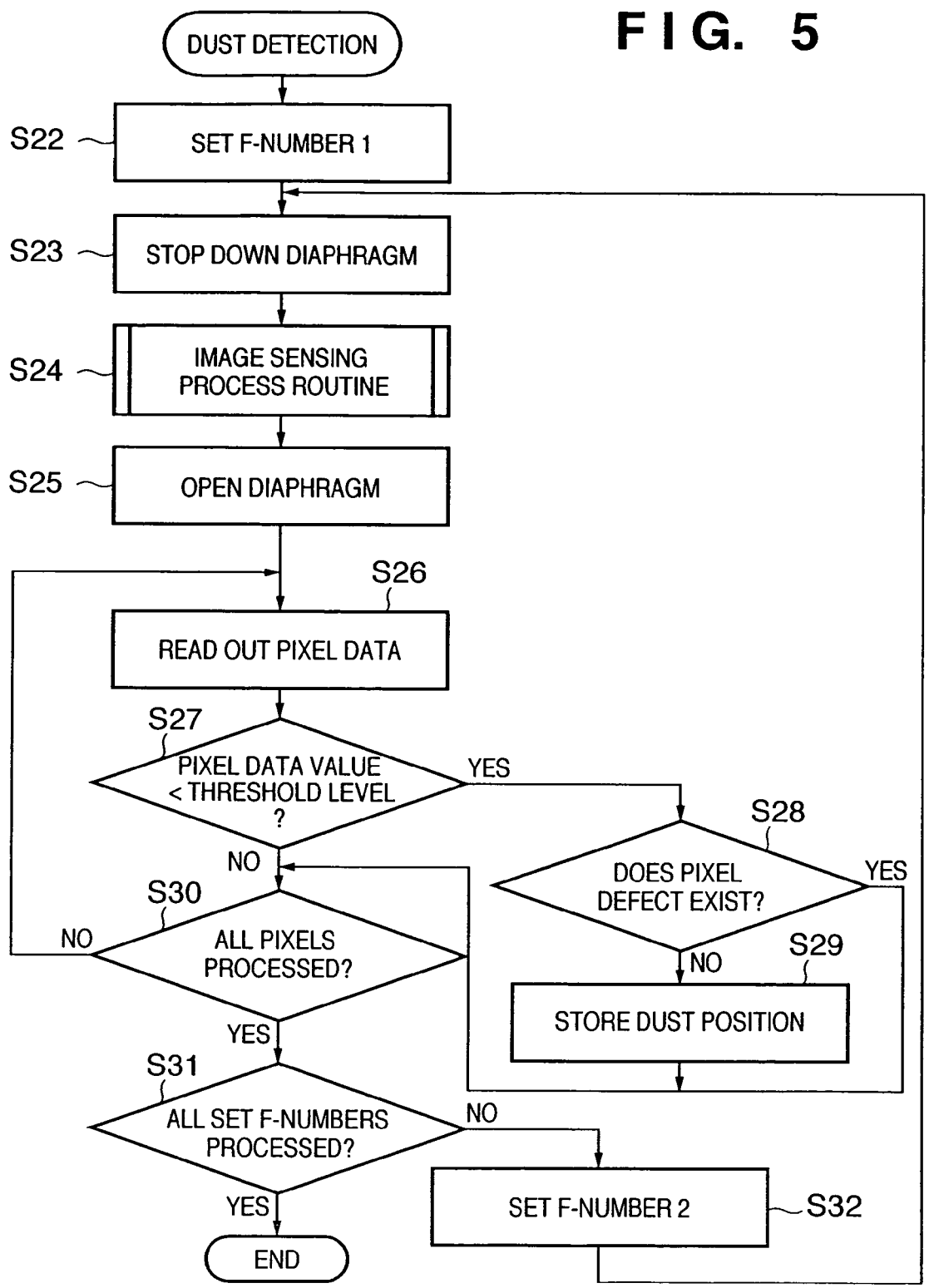
FIG. 5 is a flowchart for explaining a dust detection process in a digital camera according to the first embodiment.

FIG. 5 is a flowchart for explaining a dust detection process (process of detecting a pixel position at which an image error has occurred due to dust) in the digital camera according to the first embodiment. This process is performed by executing a dust detection process program stored in a nonvolatile memory (not shown) by the microcomputer 402.

The dust detection process starts when a dust detection image is sensed. In the dust detection process, the camera is set with the photographing optical axis 201 of the lens 200 facing a uniform luminance plane such as the exit plane of a surface light source device. Alternatively, a dust detection light unit (small-size surface light source device mounted in front of the lens) is mounted on the lens 200 to prepare for dust detection.

The first embodiment will explain the use of a normal photographing lens, but dust detection may be done by attaching to the lens mount a device which illuminates an image sensor at a uniform luminance via a diaphragm unit. In the first embodiment, a dust detection image has a uniform luminance.

After the end of preparations, if the start of the dust detection process is designated with, e.g., the cross-shaped switch 116, the microcomputer 402 sets the diaphragm. Since dust near the CCD 418 changes in imaging state depending on the F-number of the lens, dust needs to be detected at a plurality of F-numbers. First, F-number 1 (predetermined F-number corresponding to the thicknesses (distance between a dust attaching position and the CCD) of a protective glass and optical filter which are arranged on the CCD is set: in this case, e.g., F8) is set (step S22).

The microcomputer 402 causes the lens control circuit 407 to control the aperture blades of the photographing lens 200 and set the diaphragm to "F-number 1" set in step S22 (or "F-number 2" set in step S32) (step S23). At the start of the process, the diaphragm is set to the F-number set in step S22.

After the diaphragm of the photographing lens is set, photographing in the dust detection mode is executed (step S24). Details of an image sensing process routine in step S24 will be described later with reference to FIG. 4. Photographed image data is stored in the buffer memory 424.

After the end of photographing, the microcomputer 402 controls the lens control circuit 407 to set the diaphragm of the photographing lens 200 to a full-aperture value (step S25).

Data which are stored in the image buffer memory 424 and correspond to the positions of pixels of a photographed image are sequentially read out to the image processing circuit 425 (step S26). The image processing circuit 425 compares the value of each readout pixel data with a preset threshold level (step S27). If dust attaches to the CCD 418, the quantity of light incident on a pixel corresponding to the dust attaching position decreases. By comparing each pixel data with the set threshold level, a pixel suffering an image error can be detected. If external light enters the camera main body in the dust position detection process, data obtained from a defect pixel may exceed the threshold level, and thus external light must be shielded. When no uniform luminance plane is expected in photographing, determination may be simply based on, e.g., a difference from a neighboring pixel output, instead of the threshold level of the luminance.

If the value of the readout pixel data is smaller than the threshold level, it is confirmed whether the pixel has a pixel defect by comparing the position of the readout pixel data with the position of a defect pixel (pixel defect) in the manufacture that is stored in advance in the pixel defect position memory (step S28). Only if it is determined that the pixel does not have any pixel defect, the pixel position is registered in the dust position memory 427 (step S29).

Dust position data detected using F-number 1 set in step S22 is defined as dust correction data 1.

The same determination process (steps S26 to S29) is performed for all pixels. After all pixels are processed (step S30), it is determined whether the dust detection process has been performed for all F-numbers for detection (step S31). If an unprocessed F-number remains, the flow blanches to step S32.

In general, dust attaches not onto the surface of the CCD 418 but onto a protective glass or optical filter, and the imaging state changes depending on the F-number of the photographing lens. When the F-number is close to a full-aperture value, an image is out of focus and is not influenced by attachment of small dust. To the contrary, if the F-number is large, dust is clearly imaged and influences an image. For this reason, correction proper for a photographed image cannot be done unless a dust position is detected at a plurality of F-numbers and a photographed image is corrected with dust correction data corresponding to an F-number.

That is, when dust correction data which is obtained on the basis of an image photographed at a large F-number with a large depth of field is used for an image which is photographed at a small F-number close to a full-aperture value with a shallow depth of field, a correction process is done even for a portion (which is originally out of focus) which need not be corrected in practice. In contrast, when dust correction data which is photographed at an F-number close to a full-aperture value is used, dust correction data for dust which is sensed in image data photographed at a large F-number cannot be obtained, and no necessary correction process is performed. In this manner, when an F-number used to generate dust correction data and an F-number in photographing are different, a portion free from any influence of dust is excessively corrected, or a portion having dust is not corrected.

To prevent this, another F-number (F-number 2: e.g., F22) is set (step S32). The flow then returns to step S23 to photograph an image again and perform the dust detection process (dust correction data detected at F-number 2 is defined as dust correction data 2).

After steps S23 to S31 are executed and all dust position data for a plurality of F-numbers are detected, the routine ends. This flowchart executes dust detection at two F-numbers, but more accurate dust correction data can be created by performing dust detection at a larger number of F-numbers. With this data, dust can be more accurately corrected.

(Image Sensing Process Routine)

Figure 4:
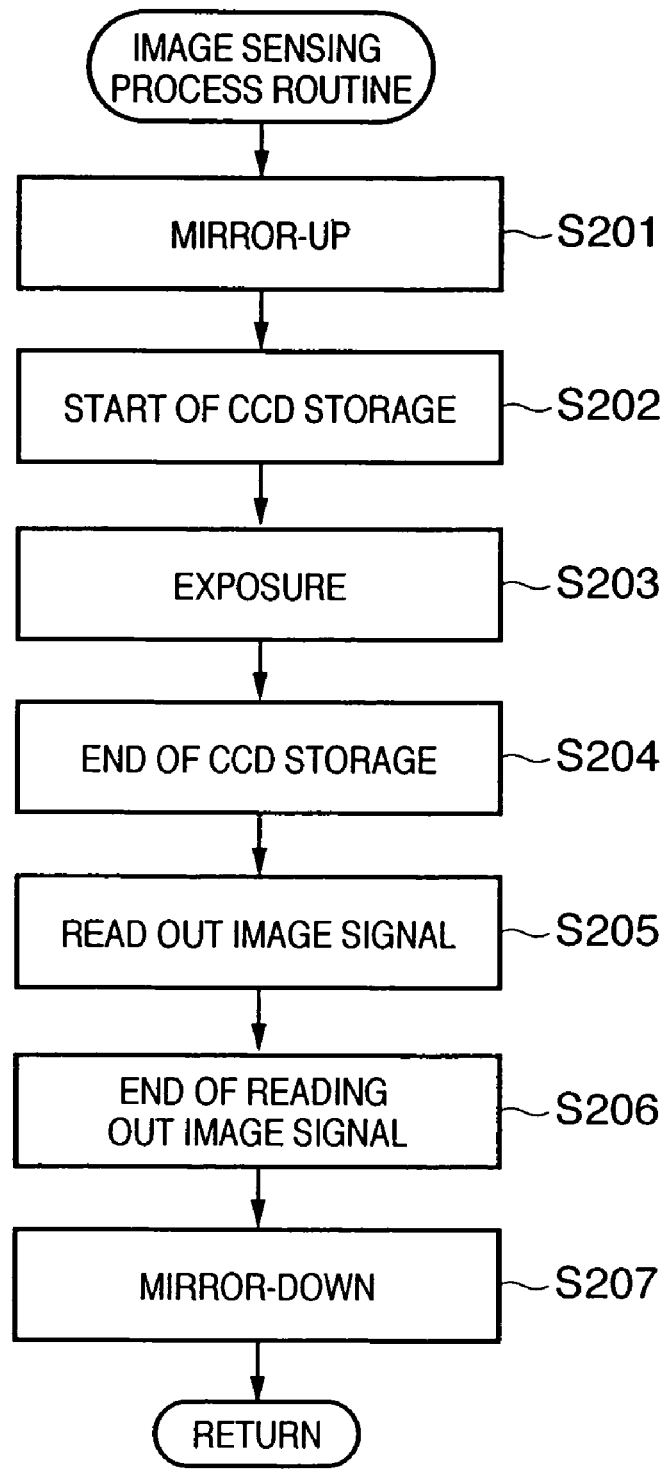
FIG. 4 is a flowchart for explaining details of an image sensing process routine in step S24 of FIG. 5.

Details of the image sensing process routine in step S24 of FIG. 5 will be described with reference to the flowchart shown in FIG. 4. This process is performed by executing an image sensing process program stored in a nonvolatile memory (not shown) by the microcomputer 402.

When the image sensing process routine is executed, the microcomputer 402 operates the quick-return mirror 203 shown in FIG. 3 in step S201 to perform so-called mirror-up, and retracts the quick-return mirror from the photographing optical path.

Charge storage in the CCD 418 starts in step S202, and the front curtain 210 (see FIG. 3) and rear curtain 209 (see FIG. 3) of the shutter travel to perform exposure in step S203. Charge storage in the CCD 418 (see FIG. 3) ends in step S204. In step S205, an image signal is read out from the CCD 418, and image data processed by the A/D converter 423 and image processing circuit 425 is temporarily stored in the buffer memory 424.

If read of all image signals from the CCD 418 ends in step S206, the flow shifts to step S207. In step S207, the quick-return mirror (203 in FIG. 3) is changed to so-called mirror-down. Then, the quick-return mirror returns to a position (inclined position) at which it guides object light to the viewfinder optical system, and a series of image sensing operations end.

(Dust Correction Process)

A dust correction process (dust correction process for a normally photographed image) in normal photographing in the digital camera according to the first embodiment will be explained. This process is performed by executing a dust process operation program stored in a nonvolatile memory (not shown) by the microcomputer 402.

Assume that the above-mentioned dust correction data 1 and 2 are stored in the dust position memory 427 prior to photographing. The photographer achieves desired photographing preparation operation by using the photographing mode dial 117, menu switch 124, electronic dial 115, and the like, and presses the release button 114 halfway (the switch (SW1) 405 is turned on), starting photographing.

The microcomputer 402 executes autofocus control with the distance measurement circuit 413 and lens control circuit 407, and controls the lens 200 to an in-focus position. At the same time, the microcomputer 402 performs photometry operation by using the photometry circuit 414 to determine a TV value and F-number for control in accordance with a set photographing mode. After these processes end, the microcomputer 402 executes the image sensing process routine in FIG. 4 to sense an image. After the image is temporarily stored in the buffer memory 424, the microcomputer 402 performs the dust correction process.

Figure 6:
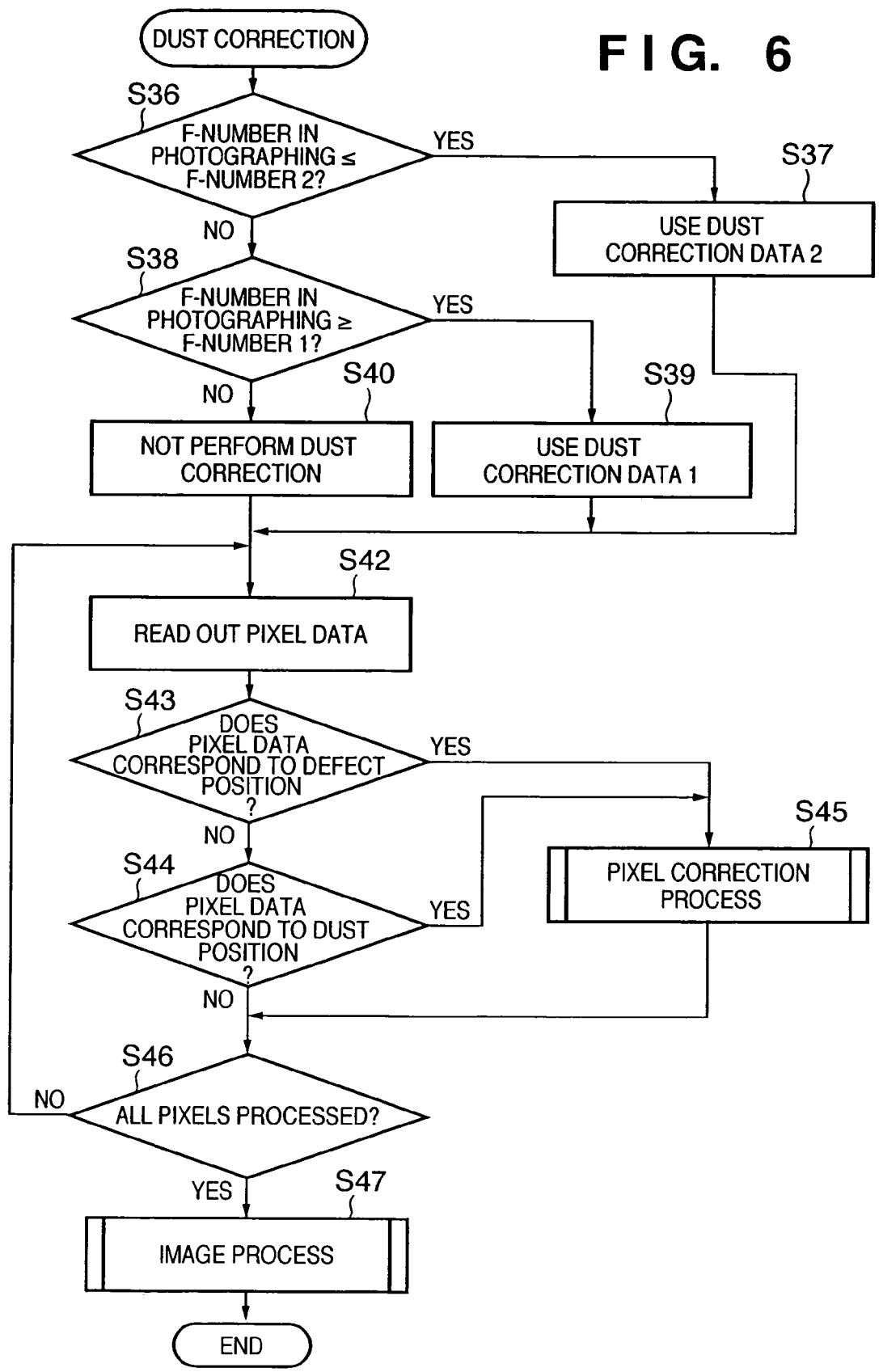
FIG. 6 is a flowchart for explaining a dust correction process in the digital camera according to the first embodiment.

FIG. 6 is a flowchart for explaining a dust correction process in normal photographing in the digital camera according to the first embodiment.

In the dust correction process, dust correction data for use is determined on the basis of an F-number used in photographing from a plurality of dust correction data which are stored in the dust position memory 427. More specifically, it is determined whether an F-number in photographing is equal to F-number 2 (in this case, F22) used to detect dust correction data 2 or corresponds to a smaller aperture (F-number is larger) (step S36). If the F-number in photographing is equal to F-number 2 or corresponds to a smaller aperture, the flow blanches to step S37 to determine that dust correction data 2 corresponding to F-number 2 is used. If the F-number in photographing is closer to a full-aperture value (smaller F-number) than F-number 2, the flow advances to step S38.

In step S38, it is determined whether the F-number in photographing is equal to F-number 1 (in this case, F8) used to detect dust correction data 1 or corresponds to a smaller aperture (F-number is larger). If the F-number in photographing is equal to F-number 1 or corresponds to a smaller aperture, the flow blanches to step S39 to determine that dust correction data 1 corresponding to F-number 1 is used. If the F-number in photographing is closer to a full-aperture value (smaller F-number) than F-number 1 in step S38, the flow advances to step S40, and it is set to correct only a pixel defect generated in the manufacture of the CCD without performing any dust correction process.

Note that the first embodiment adopts two dust correction data, and the process (steps S36 to S39) of determining dust correction data used for the dust correction process is executed at two stages. When three or more dust correction data are prepared, an F-number corresponding to each dust correction data and an F-number in photographing are similarly compared to determine that dust correction data which is larger than the F-number in photographing and is detected for an F-number closest to the F-number in photographing is used.

After dust correction data used in the dust correction process is determined by the processes in steps S36 to S40, the microcomputer 402 sequentially reads out pixel data from the image buffer memory 424 (step S42), and starts pixel defect correction. The pixel address of readout pixel data and that registered in the pixel defect position memory 426 are compared to confirm whether the pixel data corresponds to a defect pixel (step S43).

If the pixel data does not correspond to a defect pixel, the flow advances to step S44 to compare the pixel address of the readout pixel data and that registered in dust correction data and confirm whether the pixel data corresponds to a pixel at which dust has been detected. If it is set in step S40 that no dust correction process is performed, the process proceeds on the assumption that no pixel address is registered in dust correction data, and the flow need not branch from step S44 to step S45.

If the pixel address of the readout pixel data coincides with the address of a defect pixel or a pixel at which dust has been detected in step S43 or S44, the image processing circuit 425 performs a correction process for the readout pixel data in step S45. The correction process can be done by various methods, and in the first embodiment, the pixel data is interpolated using the values of surrounding nondefective pixel data.

In this way, according to the first embodiment, the microcomputer 402, image processing circuit 425, and buffer memory 424 execute the pixel correction process in step S45, and form a dust correction process means. Since dust correction data is created for each F-number, a pixel address to be interpolated changes in accordance with the F-number in photographing. Corrected pixel data is overwritten in the buffer memory 424.

It is confirmed whether all pixel data have been read out (step S46). If unread pixel data remains, the flow returns to step S42 to perform the above process for the unprocessed pixel data. If it is determined in step S46 that all pixels have been read, all image data of one image have undergone the interpolation process. The image data which are stored in the buffer memory 424 undergo an image process such as compression by the image processing circuit 425 (step S47), and written in the recording device, ending the dust correction process (and photographing process).

As described above, according to the first embodiment, the dust detection process is performed using a plurality of F-numbers, and a plurality of dust correction data corresponding to the respective F-numbers are stored. Optimal one of the dust correction data is used in accordance with an F-number in photographing, and a photographed image is corrected. As a result, an appropriate dust correction process can be achieved without generating any of the following problems: when an F-number used in dust detection is greatly different from that in photographing, dust correction is unnecessarily performed to excessively correct an image, or no necessary dust correction process is performed, resulting in an image in which dust stands out.

Second Embodiment

A digital camera as an example of an image sensing apparatus according to the second embodiment of the present invention will be described. The basic arrangement of the digital camera according to the second embodiment is the same as that of the digital camera according to the first embodiment described above, a description of the arrangement will be omitted, and a dust detection process and dust correction process according to the second embodiment will be explained.

(Dust Detection Process)

Figure 7:
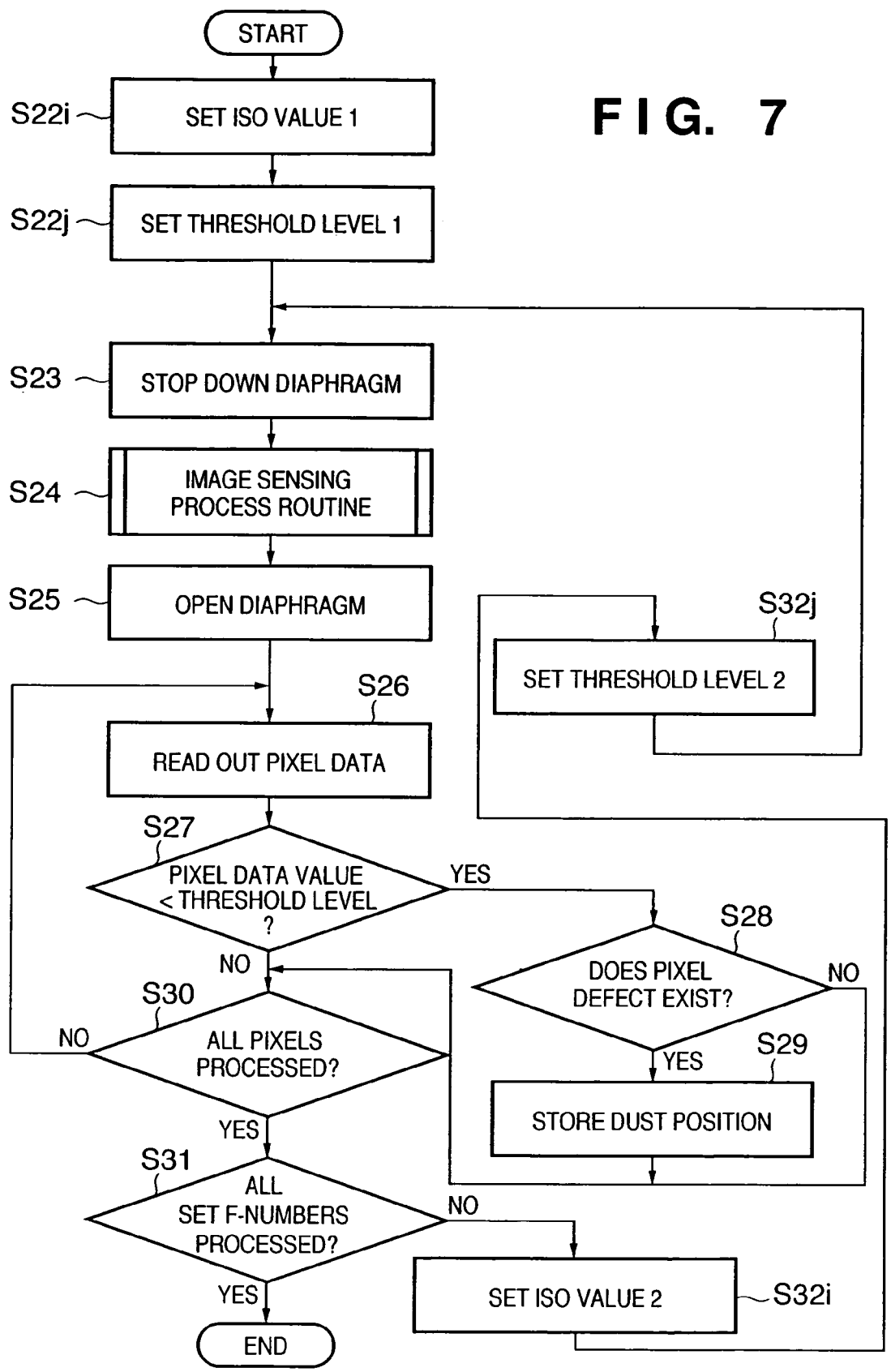
FIG. 7 is a flowchart for explaining a dust detection process in a digital camera according to the second embodiment.

FIG. 7 is a flowchart for explaining a dust detection process (process of detecting a pixel position at which an image error occurs due to dust) in the digital camera according to the second embodiment.

In FIG. 7, the same step numerals denote steps in which the same processes as those in FIG. 5 described in the first embodiment are performed, and a repetitive description thereof will be omitted.

Similar to the first embodiment, preparations for the dust detection process are made (for example, the camera is set with a photographing optical axis 201 of a lens 200 facing a uniform luminance plane such as the exit plane of a surface light source device).

After the end of preparations, if the start of the dust detection process is designated with, e.g., a cross-shaped switch 116, a microcomputer 402 sets a sensitivity given by an ISO value (read gain of a CCD 418). First, an ISO value (ISO value 1: e.g., ISO 400) is set (step S22*i*).

A dust detection level (threshold level 1) corresponding to the set ISO value is set. Since noise of the CCD 418 changes depending on the ISO value, dust needs to be detected while the threshold level of dust detection is changed under a plurality of sensitivity conditions (step S22*j*).

Operations from steps S23 to S31 are the same as that in FIG. 5, and only the main point will be described.

After that, a photographing lens is stopped down (step S23). At this time, the F-number is a preset F-number (small aperture) large enough to detect dust.

Photographing is done in the image sensing process routine described with reference to FIG. 4 (step S24).

The diaphragm is opened to a full-aperture value (step S25).

Data which are stored in an image buffer memory 424 and correspond to the positions of pixels are sequentially read out (step S26). The value of each readout image data is compared with a threshold level (first threshold level is set in step S22*j*) corresponding to an ISO sensitivity used in photographing (first ISO sensitivity is set in step S22*i*) (step S27). In order to discriminate dust from noise of the CCD 418, the image data value is compared with a threshold level which changes for each ISO sensitivity, thereby detecting a pixel at which an image error is generated by dust.

If the value of the readout pixel data is smaller than the threshold level, it is confirmed whether the pixel has a pixel defect by comparing the position of the readout pixel data with the position of a defect pixel (pixel defect) in the manufacture that is stored in advance in the pixel defect position memory (step S28). Only if it is determined that the pixel does not have any pixel defect, the pixel position is registered in a dust position memory 427 (step S29).

Dust position data detected using threshold level 1 set in step S22 is defined as dust correction data 1.

It is confirmed whether all pixels have been read out (step S30).

If it is determined that read of all pixels does not end, the process returns to step S26 again to read out pixel data at the next position. If it is determined that read of all pixels ends, it is determined whether the dust detection process has been performed for all ISO sensitivities for detection (step S31). If an unprocessed ISO sensitivity remains, the flow blanches to step S32*i*.

If the ISO value is high (high sensitivity), noise is large and when a pixel at the dust position is corrected using surrounding pixels in this case, the image quality may degrade adversely. To prevent this, a dust detection level corresponding to an ISO sensitivity used in photographing is set. When the ISO sensitivity is low and noise is hardly generated, dust is strictly detected; when the ISO sensitivity is high, dust which may become inconspicuous in noise is intentionally not detected.

After that, another ISO value (ISO value 2: e.g., ISO=1600) is set (step S32*i*), and a corresponding dust detection level (threshold level 2) is set (step S32*j*).

The flow returns to step S23 to photograph an image again and detect dust (dust correction data detected at ISO value 2 is used as dust correction data 2).

After steps S23 to S31 are executed and all dust position data for a plurality of ISO values are detected, the routine ends. This flowchart executes dust detection at two ISO values, but dust correction data can be more accurately created by performing dust detection at a larger number of ISO values. With this data, dust can be more accurately corrected.

(Dust Correction Process)

A dust correction process in photographing in the digital camera according to the second embodiment will be explained. This process is performed by executing a dust process operation program stored in a nonvolatile memory (not shown) by the microcomputer 402.

Assume that the above-mentioned dust correction data 1 and 2 are stored in the dust position memory 427 prior to photographing. The photographer achieves desired photographing preparation operation by using a photographing mode dial 117, menu switch 124, electronic dial 115, and the like, and presses a release button 114 halfway (a switch (SW1) 405 is turned on), starting photographing.

The microcomputer 402 executes autofocus control with a distance measurement circuit 413 and lens control circuit 407, and controls the lens 200 to an in-focus position. At the same time, the microcomputer 402 performs photometry operation by using a photometry circuit 414 to determine a TV value and F-number for control in accordance with a set photographing mode. After these processes end, the microcomputer 402 executes the image sensing process routine in FIG. 4 to sense an image. After the image is temporarily stored in the buffer memory 424, the microcomputer 402 performs the dust correction process.

Figure 8:
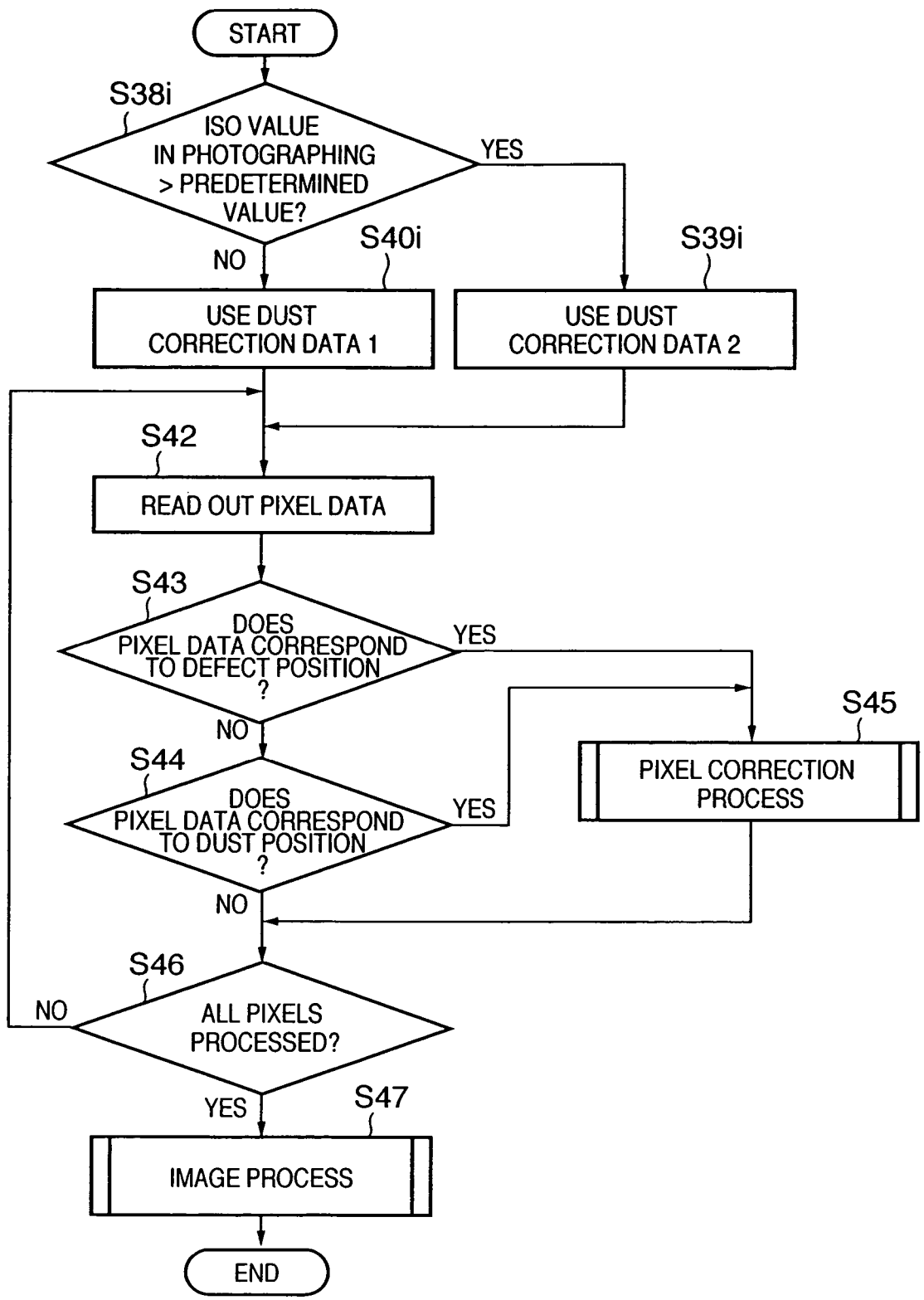
FIG. 8 is a flowchart for explaining a dust correction process in the digital camera according to the second embodiment.

FIG. 8 is a flowchart for explaining a dust correction process in photographing in the digital camera according to the second embodiment. In FIG. 8, the same step numerals denote steps in which the same processes as those in FIG. 6 described in the first embodiment are performed, and a repetitive description thereof will be omitted.

In the dust correction process, dust correction data for use is determined on the basis of an ISO value used in photographing from a plurality of dust correction data which are stored in the dust position memory 427. More specifically, the ISO value in photographing is compared with a predetermined value (value between ISO value 1 and ISO value 2) (S38*i*).

If the ISO value in photographing is larger than the predetermined value (represents a higher sensitivity), the flow blanches to step S39*i*, and it is set to perform correction by dust position data (dust correction data 2) corresponding to ISO value 2. If the ISO value in photographing is equal to or smaller than the predetermined value, the flow advances to step S40*i* to set dust correction data 1 (step S40*i*).

Similar to the first embodiment, the second embodiment adopts two dust correction data, and the process (steps S38*i* to S40*i*) of determining dust correction data used for the dust correction process is executed at two stages. When three or more dust correction data are prepared, a plurality of predetermined values to be compared are used to determine that dust correction data which is detected at an ISO value close to an ISO value in photographing is used.

After which of dust correction data is used in the dust correction process is set in steps S38*i*, S39*i*, and S40*i*, data of respective pixels are sequentially read out to start pixel defect correction (step S42).

Thereafter, an image correction process is done similarly to the first embodiment (steps S43 to S45). Since dust correction data is created for each ISO value, a pixel address to be interpolated changes in accordance with the ISO value in photographing. Corrected pixel data is overwritten in the buffer memory 424.

It is confirmed whether all pixel data have been read out (step S46). If unread pixel data remains, the flow returns to step S42 to perform the above process for the unprocessed pixel data. If it is determined in step S46 that all pixels have been read, all image data of one image have undergone the interpolation process. The image data which are stored in the buffer memory 424 undergo an image process such as compression by an image processing circuit 425 (step S47), and written in the recording device, ending the dust correction process (and photographing process).

As described above, according to the second embodiment, the dust detection process is performed using a plurality of ISO values, and a plurality of dust correction data corresponding to the respective ISO values are stored. Optimal one of the dust correction data is used in accordance with an ISO value in photographing, and a photographed image is corrected. The second embodiment can, therefore, prevent erroneous detection of CCD noise as dust upon photographing at a large ISO value, or a failure in detecting dust upon photographing at a small ISO value.

Other Embodiment

The first and second embodiments can also be combined. In this case, a dust detection process is performed at combinations of ISO values and F-numbers, and dust correction data is obtained for each combination. Dust correction data used in the dust correction process suffices to be data detected for a combination closest to a combination of an F-number and ISO value in photographing.

The above-described embodiments have described only a case wherein the present invention is applied to a digital camera. However, the same process can also be performed in sensing a still image by a digital video camera.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-265932 filed on Sep. 13, 2004, which is hereby incorporated by reference herein.

The invention claimed is:

1. An image sensing apparatus which senses an image by using an image sensor, comprising:

dust position detection unit for detecting a pixel position corresponding to dust present on the image sensor or an optical system of the image sensor from a dust detection sensed image obtained by sensing a dust detection image, the dust position detection unit detects the pixel position corresponding to the dust from a first dust detection image and a second dust detection image and stores the respective detected pixel position as a first dust correction data and a second dust correction data, wherein the second dust detection image is sensed using an F-number larger than an F-number that is used for sensing the first dust detection image; and correction unit for performing a correction process for pixel data at the pixel position corresponding to the dust among the pixel data which form a normally sensed image obtained by normal image sensing, wherein:

the correction unit does not perform the correction process if an F-number used for sensing the normally sensed image is smaller than the F-number used for sensing the first dust detection image;

the correction unit performs the correction process using the first dust correction data if the F-number used for sensing the normally sensed image is larger than the F-number used for sensing the first dust detection image and is smaller than the F-number used for sensing the second dust detection image; and the correction unit performs the correction process using the second dust correction data if the F-number used for sensing the normally sensed image is larger than the F-number used for sensing the second dust detection image.

2. The apparatus according to claim 1, further comprising storage unit for storing information representing a position of a defect pixel in manufacture of the image sensor,
wherein said correction unit performs the correction process for pixel data which does not correspond to the position of the defect pixel and exists at the pixel position corresponding to the dust.

3. The apparatus according to claim 1, wherein the correction process includes a process of interpolating data at the pixel position corresponding to the dust by surrounding non-defective pixel data.

4. The apparatus according to claim 1, wherein the image sensing apparatus includes a lens exchangeable type digital camera.

5. A method of controlling an image sensing apparatus which senses an image by using an image sensor comprising:
a dust position detection step of detecting a pixel position corresponding to dust present on the image sensor or an optical system of the image sensor from a dust detection sensed image obtained by sensing a dust detection image, the dust position detection step detects the pixel position corresponding to the dust from a first dust detection image and a second dust detection image and stores the respective detected pixel position as a first dust correction data and a second dust correction data, wherein the second dust detection image is sensed using an F-number larger than an F-number that is used for sensing the first dust detection image; and
a correction step of performing a correction process for pixel data at the pixel position corresponding to the dust among the pixel data which form a normally sensed image obtained by normal image sensing,
wherein:
the correction step does not perform the correction process if an F-number used for sensing the normally sensed image is smaller than the F-number used for sensing the first dust detection image;
the correction step performs the correction process using the first dust correction data if the F-number used for sensing the normally sensed image is larger than the F-number used for sensing the first dust detection image and is smaller than the F-number used for sensing the second dust detection image; and
the correction step performs the correction process using the second dust correction data if the F-number used for sensing the normally sensed image is larger than the F-number used for sensing the second dust detection image.

6. An image sensing apparatus which senses an image by using an image sensor, comprising:
dust position detection unit for detecting a pixel position corresponding to dust present on the image sensor or an optical system of the image sensor from a dust detection sensed image obtained by sensing a dust detection image, the dust position detection unit detects the pixel position corresponding to the dust from a first dust detection image and a second dust detection image and stores the respective detected pixel position as a first dust correction data and a second dust correction data, wherein the second dust detection image is sensed using an ISO value larger than an ISO value used for sensing the first dust detection image; and
correction unit for performing a correction process for pixel data at the pixel position corresponding to the dust among the pixel data which form a normally sensed image obtained by normal image sensing,
wherein:
the correction unit performs the correction process using the first dust correction data if an ISO value used for sensing the normally sensed image is smaller than the ISO value used for sensing the first dust detection image;
the correction unit performs the correction process using the second dust correction data if the ISO value used for sensing the normally sensed image is larger than the ISO value used for sensing the first dust detection image and is smaller than the ISO value used for sensing the second dust detection image; and
the correction unit does not perform the correction process if the ISO value used for sensing the normally sensed image is larger than the ISO value used for sensing the second dust detection image.

7. The apparatus according to claim 6, further comprising storage unit for storing information representing a position of a defect pixel in manufacture of the image sensor,
wherein said correction unit performs the correction process for the pixel data which does not correspond to the position of the defect pixel and exists at the pixel position corresponding to the dust.

8. The apparatus according to claim 6, wherein the correction process includes a process of interpolating data at the pixel position corresponding to the dust by surrounding non-defective pixel data.

9. The apparatus according to claim 6, wherein the image sensing apparatus includes a lens exchangeable type digital camera.

10. A method of controlling an image sensing apparatus which senses an image by using an image senor, comprising:
a dust position detection step of detecting a pixel position corresponding to dust present on the image sensor or an optical system of the image sensor from a dust detection sensed image obtained by sensing a dust detection image, the dust position detection unit detects the pixel position corresponding to the dust from a first dust detection image and a second dust detection image and stores the respective detected pixel position as a first dust correction data and a second dust correction data, wherein the second dust detection image is sensed using an ISO value larger than an ISO value used for sensing the first dust detection image; and
a correction step of performing a correction process for pixel data at the pixel position corresponding to the dust among the pixel data which form a normally sensed image obtained by normal image sensing,
wherein:
the correction step performs the correction process using the first dust correction data if an ISO value used for sensing the normally sensed image is smaller than the ISO value used for sensing the first dust detection image;
the correction step performs the correction process using the second dust correction data if the ISO value used for sensing the normally sensed image is larger than the ISO value used for sensing the first dust detection image and is smaller than the ISO value used for sensing the second dust detection image; and
the correction step does not perform the correction process if the ISO value used for sensing the normally sensed image is larger than the ISO value used for sensing the second dust detection image.

* * * * *